United States Patent [19]
Lane et al.

[11] Patent Number: 5,787,708
[45] Date of Patent: Aug. 4, 1998

[54] COMBUSTION EXHAUST PURIFICATION SYSTEM AND METHOD VIA HIGH SAC VOLUME FUEL INJECTORS

[75] Inventors: William H. Lane, Chillicothe; Daniel J. Learned, Peoria; Randy N. Peterson, Edelstein; Aaron L. Smith, East Peoria, all of Ill.

[73] Assignee: Caterpillar Inc., Peoria, Ill.

[21] Appl. No.: 814,164

[22] Filed: Mar. 10, 1997

Related U.S. Application Data

[63] Continuation of Ser. No. 573,104, Dec. 15, 1995, abandoned.

[51] Int. Cl.⁶ ............................................. F25C 1/24
[52] U.S. Cl. ............................... 60/301; 239/533.9
[58] Field of Search ..................... 239/533.3, 533.9, 239/585.1; 60/301, 303

[56] References Cited

U.S. PATENT DOCUMENTS

| | | | |
|---|---|---|---|
| 3,597,165 | 8/1971 | Keith et al. | 23/288 F |
| 3,896,616 | 7/1975 | Keith et al. | 60/274 |
| 3,945,204 | 3/1976 | Knapp | 60/274 |
| 4,452,040 | 6/1984 | Kobashi | 60/274 |
| 4,526,323 | 7/1985 | Saifert | 239/533.9 |
| 4,541,239 | 9/1985 | Tokura et al. | 60/286 |
| 4,909,440 | 3/1990 | Mitsuyasu et al. | 239/533.9 |
| 4,981,267 | 1/1991 | Scott | 239/533.9 |
| 5,155,994 | 10/1992 | Muraki et al. | 60/301 |
| 5,189,876 | 3/1993 | Hirota et al. | 60/286 |
| 5,193,340 | 3/1993 | Kamihara | 60/286 |
| 5,201,300 | 4/1993 | Iiyama | 123/569 |
| 5,201,802 | 4/1993 | Hirota et al. | 60/276 |
| 5,205,492 | 4/1993 | Khinchuk | 239/533.9 |
| 5,209,061 | 5/1993 | Takeshima | 60/278 |
| 5,233,830 | 8/1993 | Takeshima et al. | 60/278 |
| 5,313,792 | 5/1994 | Katoh et al. | 60/301 |
| 5,332,554 | 7/1994 | Yasaki et al. | 60/303 |
| 5,349,816 | 9/1994 | Sanbayashi et al. | 60/277 |
| 5,412,946 | 5/1995 | Oshima et al. | 60/303 |
| 5,522,218 | 6/1996 | Lane et al. | 60/274 |
| 5,578,277 | 11/1996 | White et al. | 422/180 |

*Primary Examiner*—John T. Kwon
*Attorney, Agent, or Firm*—Robert J. Hampsch

[57] ABSTRACT

The present invention is particularly well suited for purifying exhaust from relatively large lean burn diesel engines. The emissions purification system causes the addition of an optimal amount of fuel through the engine fuel injector after closure of the fuel injector needle check valve by enlarging the fuel injector SAC volume. The optimal amount corresponds to an amount that will achieve optimal NOx reduction rates for the given engine operating condition and exhaust temperature when the exhaust is passes through appropriate deNOx and oxidation catalysts located downstream from the injector. The emissions purification system of the present invention has the ability to greatly reduce NOx content of the exhaust while maintaining HC emissions at acceptable levels and greatly reducing system complexity.

17 Claims, 2 Drawing Sheets

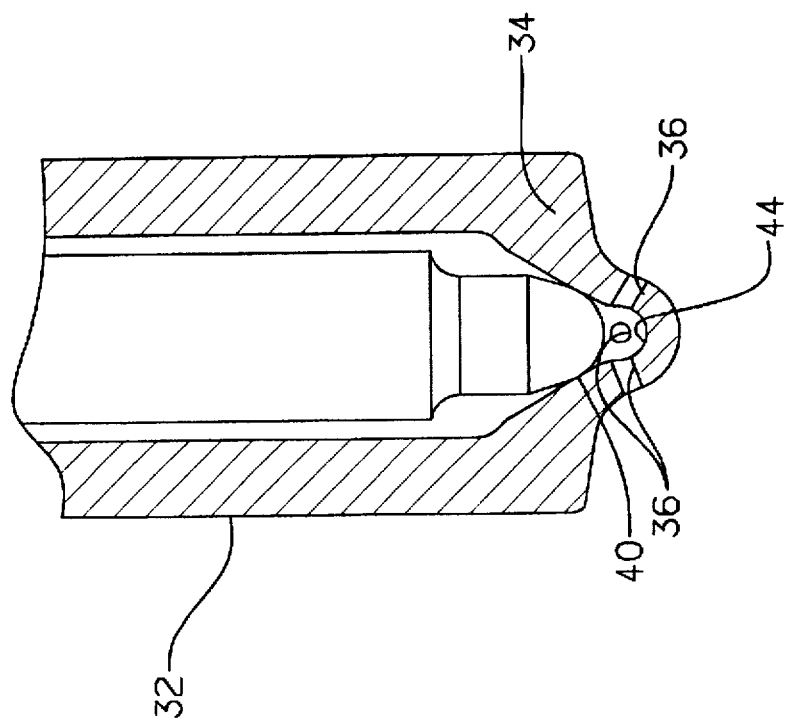
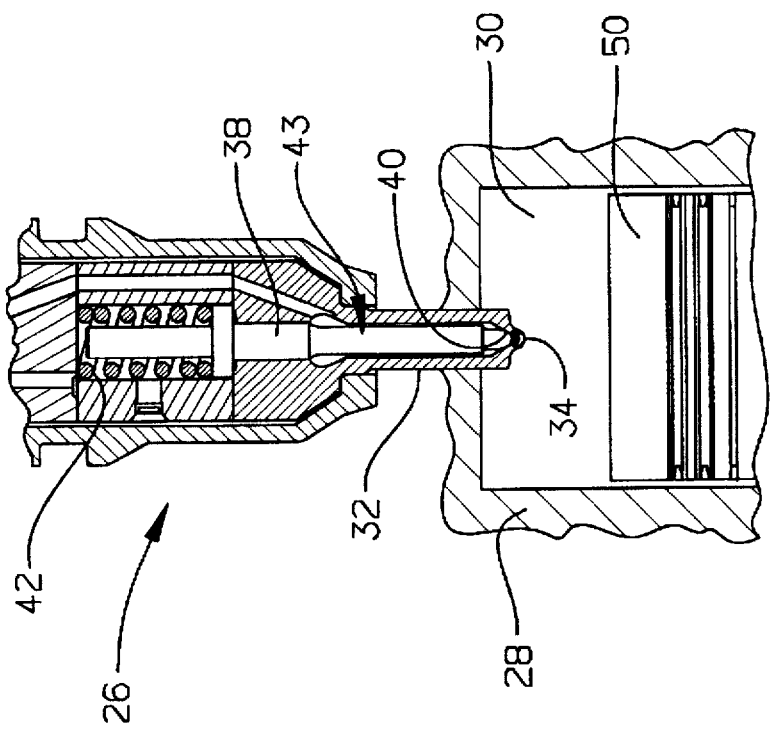

COMBUSTION EXHAUST PURIFICATION SYSTEM AND METHOD VIA HIGH SAC VOLUME FUEL INJECTORS

This is a file wrapper continuation of application Ser. No. 08/573,104, filed Dec. 15, 1995, now abandoned.

TECHNICAL FIELD

The present invention relates generally to purification of combustion exhaust and specifically to the treating of an exhaust gas stream of an engine for the removal of NOx from the gas stream.

BACKGROUND ART

Due primarily to federal regulations, engine manufacturers are being forced to reduce the amount of harmful compounds in the combustion exhaust. To effectively reduce the NOx concentrations in the exhaust stream of lean burning engines—including diesel and certain spark ignited engines—the present technology of NOx catalysts requires a sufficient concentration of hydrocarbon (HC) species to be present. In other words, in combustion exhaust purification systems having an oxygen environment above 3% concentration, some type of reducing agent, usually a hydrocarbon compound, must be introduced into the exhaust in order to achieve acceptable reduction levels of NOx compounds across a catalyst bed. Different means of adding the HC into the exhaust stream have been developed including the addition of HC injectors to continuously or periodically inject HC into the exhaust stream and the use of an after-injection of diesel fuel from the engine fuel injector. Unfortunately, these HC introduction methods increase system complexity and cost or do not allow for optimum vaporization of the HC.

The present invention discloses an intentional design change to the engine fuel injector to increase the concentration of HC in the exhaust stream without any additional injection equipment or control system.

DISCLOSURE OF THE INVENTION

In one aspect of the present invention an emissions purification system for an internal combustion engine is disclosed. The system includes a fuel injector disposed within an engine cylinder. The injector has a nozzle portion which defines at least one injection orifice. The nozzle portion also includes a check valve which is movable between an open position where the check valve is spaced apart from a check valve seat to allow fluid communication with the injection orifices and a closed position where the check valve engages the check valve seat and thereby blocks fluid communication with the injection orifices. The nozzle portion further includes a fuel chamber positioned between the check seat and the injection orifices. The fuel chamber is sized to add a preselected fuel quantity to the engine cylinder when the check valve is at its closed position.

In another aspect of the present invention, a method of reducing internal combustion engine emissions is disclosed. The method comprises the steps of positioning an injector in a cylinder of an internal combustion engine. The injector includes a check valve for controlling the injection of fuel into the cylinder and a fuel volume downstream of the check valve. Opening the check valve substantially during the compression stroke to initiate a main fuel injection and then closing the check valve during the compression stroke to end main fuel injection. Fuel is then drained from the downstream fuel volume into said cylinder of said internal combustion engine.

BRIEF DESCRIPTION OF THE DRAWINGS

FIG. 2 is a partial cross-sectional view of a fuel injector according to the present invention installed in a exemplary internal combustion engine cylinder.

FIG. 3 is an enlarged partial cross-sectional view of a fuel injector tip with an enlarged SAC volume according to the present invention.

BEST MODE FOR CARRYING OUT THE INVENTION

Figure 1:
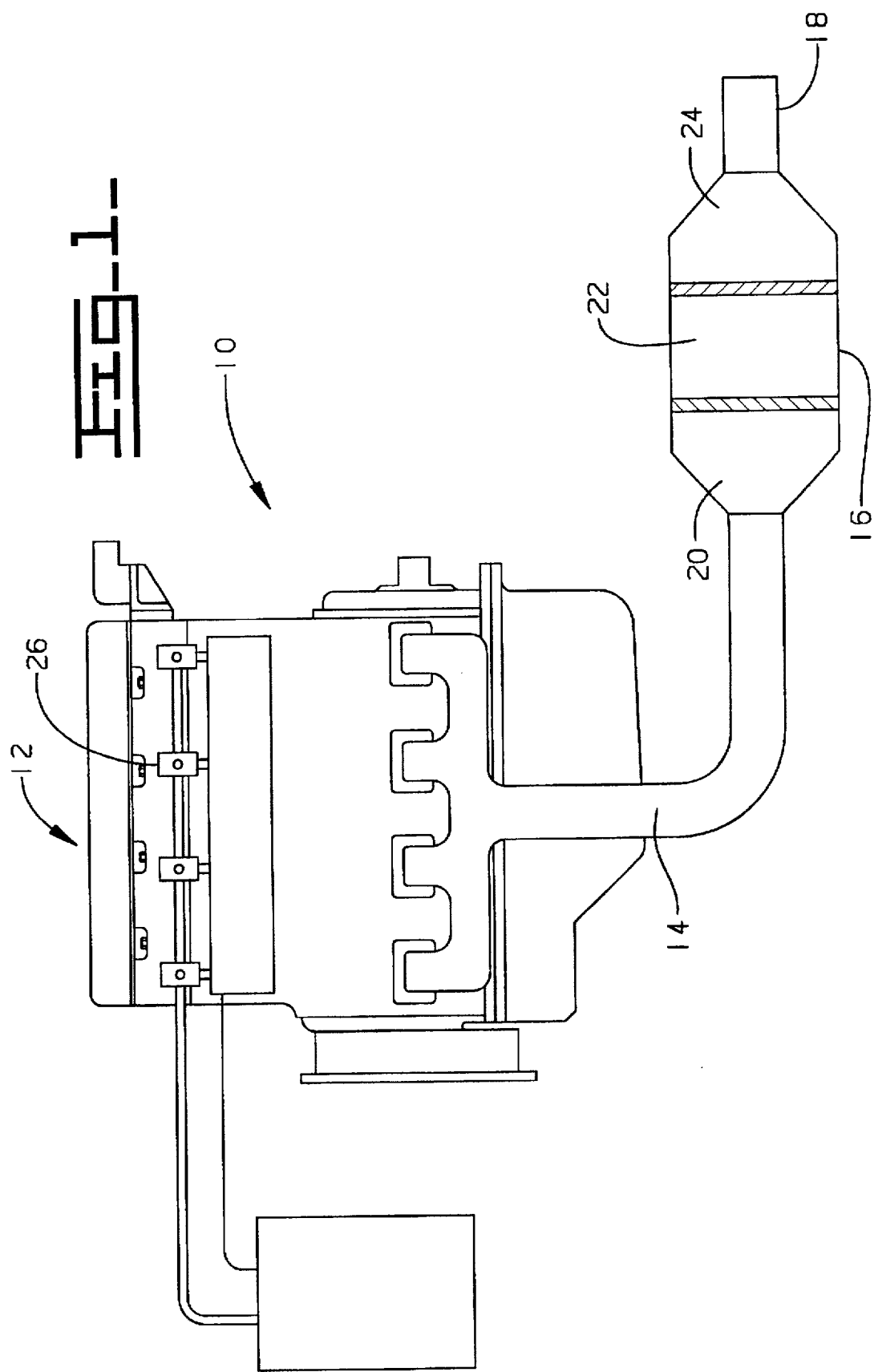
FIG. 1 is a schematic illustration of a combustion exhaust purification system according to the preferred embodiment of the present invention.

Referring now to FIG. 1, an exhaust gas purification system 10 according to the preferred embodiment of the present invention is shown in use with an internal combustion engine 12. At present, the invention finds its best application in relation to lean burn diesel engines, however, the present invention is applicable to all internal combustion engines. Exhaust exits engine 12 via exhaust passageway 14 on its way to catalytic converter 16 and eventually exits at outlet 18. Catalytic converter 16 includes a deNOx catalyst 20, such as zeolite ZSM5 or a precious metal based catalyst, or a combination of both. In many applications it may also be desirable to include an oxidation catalyst 22 of a type known in the art downstream from the deNOx catalyst. In the preferred embodiment for a lean burn diesel engine, the inclusion of a third catalyst 24 between the deNOx catalyst 20 and oxidation catalyst 22 may effectively increase reduction of undesirable nitrogen compounds present after the exhaust passes through the deNOx catalyst 20.

Additional HC enters the system through the engine fuel injector 26 which is mounted to the engine cylinder head 28 and positioned to inject fuel into the engine cylinder 30. The injector 26 can be of any conventional design including but not limited to an electronically controlled unit injector, a hydraulically-actuated electronically controlled unit injector, a mechanically-actuated injector or an injector coupled with a pump and line fuel system.

The fuel injector 26 includes a nozzle portion 32 having a tip 34 and at least one fuel injection orifice 36 defined therein. The nozzle portion further includes a needle check valve 38, a check valve seat 40, and a biasing spring 42. The check valve is movable between a first position where the check 43 is in sealing contact with the check seat 40, thereby blocking fluid communication to the injection orifices 36 and a second or open position where the check 43 is spaced from the check seat 40 to allow fluid communicaiton to the injection orifices 36. The biasing spring 42 acts on the check 43 to bias the check 43 towards its closed position.

The nozzle tip 34 further includes a fuel cavity or SAC volume 44 in fluid communication with the injection orifices 36 and being positioned between the check seat 40 and the injection orifices 36. It has been agreed in the art that in order to minimize engine exhaust emmisions, it is desireable to have a sharp end to the fuel injection. Therefore, in prior art injectors, the SAC volume has been minimized to eliminate additional fuel entering the system after closure of the check valve 38. In the present invention, the SAC volume 44 is enlarged over the prior art fuel injectors in order to have additional fuel enter the exhaust system after the main fuel injection.

The SAC volume is sized to retain an optimal amount of fuel to be volatized off of the injector tip 34 during the expansion stroke or to be atomized from the injection orifices 36 during the exhaust stroke of the engine. The optimal amount is dependent upon the exhaust temperature and the operating condition of engine 12. The term optimal amount means that amount of fuel which will produce the greatest overall NOx reduction for a given exhaust temperature and operating condition without significantly increasing the amount of HC being injected thereby increasing particulate emissions and specific fuel consumption. Although it is known that the NOx content of the exhaust is a strong function of an engine's operating condition, the relationship of these two variables varies between engine configurations and can be very unpredictable. Furthermore, the chemical reactions resulting in NOx reduction are sensitive to exhaust temperature, but this relationship is also non-linear and not satisfactorily predictable with today's modeling tools. As a result, in the preferred embodiment of the present invention, empirical data for a given engine configuration is acquired and the empirically derived optimal amount is used to determine the size of the SAC volume. The SAC volume can be size in one of two ways. First, the SAC volume can be sized to achieve the maximum reduction in NOx emissions at a particular engine condition, such as a high load condition with corresponds to a high NOx producing condition. The second and preferred method is to determine the optimal quantity across a range of the engine operating conditions and size the SAC volume to maximize the NOx reduction over the largest segment of the operating range. In this method, the maximum obtainable NOx reduction might not be achieved for any one condition, but the overall NOx signature for the engine will be reduced. It would be possible to increase the size of the SAC volume in order to achieve maximum NOx reduction at all engine conditions, however; this would require an excessive amount of HC addition at low NOx producing operating conditions. This excessive fuel addition would result in a significant fuel consumption penalty and would also produce an increase in particulate emissions.

In HC injection systems known in the art, the frequency of the injector is selected as a trade-off between optimal conversion efficiency and injector life. Higher injection frequency improves conversion efficiency, but the increased number of injector cycles results in shorter injector life. The present invention has the added advantage of being able to add the additional HC after each firing of the cylinder, thereby maximizing the conversion frequency of the deNOx catalyst. The present invention also has the advantage of adding the additional HC into the engine cylinder where the exhaust temperature and pressure are higher allowing for better vaporization which increases system efficiency.

The timing during the engine cycle at which the additional HC is added to the system will vary with engine operating conditions. Depending on whether the engine is operating at high load conditions or idle could determine whether the fuel will be volatized off of the injector tip 34 due to the high temperatures within the cylinder or instead that the additional fuel is atomized through the injection orifices during the exhaust stroke when the velocities within the engine cyclinder are high and the temperature within the cylinder are lower. It is also possible to modifiy the tip 34 of the injector 26 in order to retain the fuel within the SAC volume 44 so that the fuel is atomized into the engine cylinder during the exhaust stroke or to allow the fuel to more quickly be vaporized during the exhaust stroke.

It should be understood that only the preferred embodiments have been shown and described, and that many other different embodiments come within the contemplated scope of the present invention. For example, the preferred embodiment discloses a 4-cycle internal combustion engine; however, the present invention is equally applicable to 2-cycle engines. In any event, the above embodiments are merely examples of the present invention, and the full legal scope of the invention is defined solely with respect to the claims set forth below.

INDUSTRIAL APPLICABILITY

By injecting the additional HC directly into the combustion chamber by way of the fuel injector 26, the efficiency of undesirable contaminant removal by the catalyst is markedly increased. This increase in efficiency and effectiveness is generated by the increased frequency at which HC can be injected which results in optimal conversion.

The present invention eliminates any additional injection control equipment since the engine fuel system is used and the additional fuel is added without modifying the engine cam design or the engine control software. The use of the fuel injector to add the additional HC into the exhaust system eliminates any separate HC injectors and the supporting equipment found in most deNox conversion systems. This greatly reduces system complexity and increases system reliability since typically the injector is located in a hot, hostile environment, and requires the use of a liquid cooling system or the introduction of air and mixing of the air with the NOx reducing agent to provide sufficient cooling to avoid equipment damage.

The operation of the exhaust emission system will now be described. At the completion of the main fuel injection the check valve 38 within the tip 34 of the fuel injector 26 closes blocking fluid communication between the fuel injector pressurization chamber and the injection orifices 36, however; fuel is retained in the SAC volume 44. The modification to the injector increases the quantity of fuel which resides downstream of the check valve 38 to check seat 40 interface. After the check valve closes, this fuel quantity is retained within the fuel injector due to cohesive properties of the fuel and the high compression pressure within the engine cylinder. This additional fuel exits the injection orifices through one of a two methods. First, the fuel exits the injection orifices during the exhaust stroke when the pressure within the engine cylinder drops to a sufficiently low level and the velocities within the engine cylinder are sufficiently high to atomize the fuel through the injection orifices. The fuel enters the air which is subsequently expelled into the exhaust manifold. This method would occur where the temperatures within the injector tip were not sufficiently high to cause the fuel to vaporize. The exhaust stoke is that portion of the engine cycle when the exhaust valve 48 is open and the piston 50 acts to push the exhaust from the engine cylinder. Alternately, the temperature within the SAC volume could be sufficiently high during the expansion stroke to cause the fuel to vaporize and volatize off of the injector tip 34 and enter the exhaust system when the exhaust valve is opened. The expansion stroke being that portion of the engine cycle when both the inlet and exhaust valves 46 and 48 respectively (not shown) are closed and the ignition of the fuel within the engine cylinder causes a large increase in pressre within the cylinder moving the piston 50 from the top dead center position to the bottom dead center position.

When the exhaust valve is opened, and the piston acts to push the exhaust from the engine cylinder, the exhaust and the additional HC enter the catalytic converter 16.

In one embodiment, the catalytic converter is divided into three separate sub chambers. The first sub-chamber includes substrates which are coated with one of several deNOx catalyst 20 known in the art but are preferably coated with one of the following catalysts: Zeolite such as ZSM5 or a precious metal based catalysts or combination of both. After passing through this first sub-chamber approximately 80% or more of the NOx compounds in the exhaust stream have been reduced. However, as a consequence of the chemical reactions taking place by the addition of HC into the exhaust and the reaction with the deNOx catalyst 20, other undesirable nitrogen containing compounds, such as ammonia, may be created.

The exhaust then passes through a second subchamber which includes a selective catalyst reducer 24 that is particularly suited for reacting with and reducing the undesirable nitrogen compounds present in the exhaust. After passing through this second subchamber as much as 90% of the nitrogen containing compounds have been reduced to non-toxic gases. While most of the undesirable nitrogen containing compounds have been removed from the exhaust upon reaching this point in the exhaust stream, unacceptable levels of HC are present since only a portion of the injected HC has been consumed in reducing the NOx compounds.

The third subchamber contains a plurality of ceramic substrates coated with an oxidation catalyst 22 in order to aid in converting the remaining HCs in the exhaust to carbon dioxide and water. Since most of the undesirable nitrogen containing compounds have been reduced before reaching the oxidation catalyst 22 only small portions of the exhaust are converted back into undesirable NOx compounds upon passing through the oxidation catalyst 22. Thus, apart from the remaining HC, most of the exhaust is unaffected by passage through the oxidation catalyst contained within the third subchamber. Upon exiting all three subchambers, the exhaust contains acceptable levels of both NOx and HC.

Lab testing has shown that the increase in SAC volume is very effective at increasing the hydrocarbon levels in the engine exhaust to the necessary levels needed by the nitrogen reducing catalysts 20 and 24. The size of the SAC volume 44 is critical to achieving sufficient quantities of HC in order to maximize the effectiveness of the catalytic converter 16 in reducing NOx while not significantly impacting the specific fuel consumption of the engine and the particulate levels in the exhaust. The following lab data shows that the present invention allows the increased HC levels to be achieved without significantly increasing the engine specific fuel consumption or particulate levels.

Emissions Comparison for Combustion Exhaust

|  | SAC Volume ($mm^3$) | | |
| --- | --- | --- | --- |
|  | .65 | 1.1 | 2.3 |
| Transient Emissions Smoke (% OPAC) | | | |
| A | 14.9 | 15.3 | 15.9 |
| B | 6.1 | 2.3 | 2.7 |
| C | 31.9 | 26.4 | 30.6 |
| NOx | 7.52 | 6.98 | 7.60 |
| Hydrocarbons | 0.57 | 0.82 | 1.78 |
| Particulates | 0.45 | 0.46 | 0.50 |
| Steady-State Rated BSFC | 210 | 210 | 215 |

Other aspects, objects and advantages of this invention can be obtained from a study of the drawings, the disclosure and the appended claims.

We claim:

1. An emissions purification system for an internal combustion engine comprising:
   a fuel injector disposed within an engine cylinder and adapted for injecting fuel therein, said fuel injector having a nozzle portion defining at least one injection orifice, said nozzle portion including a check seat and a check valve movable between an open position where said check valve is spaced apart from said check seat allowing fluid communication between a source of fuel and said injection orifices and a closed position where said check valve engages said check seat blocking fluid communication between said source of fuel and said injection orifice;
   a first deNOx catalyst positioned downstream of said engine cylinder;
   an oxidation catalyst disposed downstream of said first deNOx catalyst;
   a third catalyst that promotes reduction of nitrogen containing compounds present in the exhaust downstream of said first deNOx catalyst, said third catalyst disposed between said first deNOx catalyst and said oxidation catalyst;
   said nozzle portion of said fuel injector further including a fuel chamber having a chamber volume, said fuel chamber positioned between said check seat and said injection orifices and in fluid communication with said injection orifices, said chamber volume adapted to retain a preselected fuel volume;
   a means for injecting fuel from said source of fuel to said engine cylinder via said fuel chamber and said injection orifices when said check seat and check valve are oriented in said open position; and
   a means for subsequently introducing said preselected fuel volume retained within said fuel chamber to said engine cylinder via said injection orifices after said check seat and check valve are at said closed position;
   wherein excess hydrocarbons are introduced into the emissions of said engine.

2. The emissions purification system of claim 1 wherein said preselected fuel volume is injected substantially during the expansion stroke of said engine.

3. The emissions purification system of claim 1 wherein the fuel injector is of a construction to atomize said preselected fuel volume during the exhaust stroke of said engine.

4. The emissions purification system of claim 1 wherein the fuel injector is of a construction to volatize said preselected fuel volume during the expansion stroke of said engine.

5. The emissions purification system of claim 1 wherein said preselected fuel volume is sized to add substantially the predetermined optimal amount of fuel over a portion of the operating range of said engine and over a range of exhaust temperatures.

6. The emissions purification system of claim 5 wherein the preselected fuel volume is sized to ensure said preselected optimal amount of fuel is added to said engine cylinder during high NOx producing conditions of said engine.

7. The emissions purification system of claim 5 wherein said preselected optimal amounts of fuel are predetermined empirically for a given combustion source.

8. A method of reducing internal combustion engine emissions using a fuel injector disposed in a cylinder of an internal combustion engine, said injector including a check valve for controlling the injection of fuel into said engine cylinder and a chamber having a selected volume in fluid communication with said check valve and being positioned downstream of said check valve, said method comprising the steps of:

opening said check valve substantially during the compression stroke to initiate a main fuel injection;

closing the check valve during the compression stroke to end main fuel injection;

retaining a prescribed volume of fuel in said downstream chamber;

vaporizing said prescribed volume of fuel in said downstream chamber into said engine cylinder; and directing said engine emissions with said prescribed volume of fuel through a plurality of catalytic substrates including a deNOx catalyst, an oxidation catalyst, and a third catalyst that promotes disassociation of nitrogen in nitrogen containing compounds present in the exhaust downstream of said deNOx catalyst.

9. The method of claim 8 wherein the step of directing said engine emissions with said prescribed volume of fuel through a plurality of catalytic substrates further includes the step of directing said engine emissions through a first substrate coated with a deNOx catalyst, said first substrate disposed downstream of said engine cylinder.

10. The method of claim 9 wherein the step of directing said engine emissions with said prescribed volume of fuel through a plurality of catalytic substrates further includes the step of directing said engine emissions through a second substrate coated with an oxidation catalyst, said second substrate disposed downstream of said first substrate.

11. The method of claim 10 wherein the step of directing said engine emissions with said prescribed volume of fuel through a plurality of catalytic substrates further includes the step of directing said engine emissions through a third substrate coated with a catalyst that promotes disassociation of nitrogen in nitrogen containing compounds present in the exhaust downstream of said first substrate, said third substrate disposed between said first substrate and said second substrate.

12. The method of claim 8 further including the steps of predetermining an optimal fuel volume to be vaporized after said check valve closes.

13. The method of claim 12 wherein the step of predetermining said optimal fuel volume to be vaporized further includes empirically predetermining said optimal fuel volume to be vaporized for a given combustion source.

14. The method of claim 8 wherein the step of vaporizing said fuel in said downstream chamber further includes volitizing off said fuel in said downstream chamber during the expansion stroke of said engine.

15. The method of claim 8 wherein the step of vaporizing said fuel in said downstream chamber further includes atomizing said fuel in said downstream chamber from the injection orifices during the exhaust stroke of the engine.

16. The method of claim 12 wherein said step of predetermining said optimal fuel volume to be vaporized after said check valve closes further comprises:

measuring the exhaust temperature of said engine and selected engine operating parameters; and determining said optimal fuel volume in response thereto.

17. An emissions purification system for an internal combustion engine comprising:

a fuel injector disposed within an engine cylinder and adapted for injecting fuel therein, said fuel injector having a nozzle portion defining at least one injection orifice, said nozzle portion including a check seat and a check valve movable between an open position where said check valve is spaced apart from said check seat allowing fluid communication between a source of fuel and said injection orifices and a closed position where said check valve engages said check seat blocking fluid communication between said source of fuel and said injection orifice;

a fuel chamber defined within said nozzle portion of said injector, said fuel chamber further having a chamber volume, said fuel chamber positioned between said check seat and said injection orifices and in fluid communication with said injection orifices, said chamber volume adapted to retain a preselected fuel volume;

a plurality of catalytic substrates disposed downstream of said engine cylinder, said plurality of catalytic substrates including a deNox catalyst, an oxidation catalyst, and a third catalyst that promotes disassociation of nitrogen in nitrogen containing compounds present in the exhaust downstream of said deNOx catalyst; and a controller adapted for moving said check valve thereby allowing a prescribed volume of fuel from said source of fuel to said injector;

said prescribed volume of fuel includes a first volume of fuel to be injected into said engine cylinder via said injection orifices for said main combustion and a second volume of fuel to be retained within said fuel chamber and subsequently introduced to said engine cylinder via said injection orifices during said exhaust stroke of said engine cylinder;

wherein excess hydrocarbons are introduced into the emissions from said engine cylinder.

* * * * *